Patented Feb. 13, 1934

1,947,315

UNITED STATES PATENT OFFICE 1,947,315

SEPARATION OF VITAMINS FROM SAPONIFIABLE OILS

Walter O. Snelling, Allentown, Pa.

No Drawing. Renewal of forfeited application Serial No. 150,620, November 24, 1926. This application October 24, 1928. Serial No. 314,846

11 Claims. (Cl. 167—81)

My invention relates to improvements in the concentration and separation of non-saponifiable vitamin substances from cod liver oil and other saponifiable oils containing anti-rachitic and growth-promoting constituents. The principal object of my invention is to provide improved means for obtaining concentrates from saponifiable materials containing small amounts of vitamin bodies. The present application is a renewal of my forfeited application S. N. 150,620, filed November 24, 1926.

The medicinal properties of cod liver oil have long been recognized, but the therapeutic usefulness of cod liver oil and equivalent fish liver oils such as haddock and pollock liver oils for example, has been greatly lessened by the unpleasant taste of these oils. The forming of emulsions of cod liver oil with aqueous solutions of mineral salts has been widely used as a means of administering fish liver oils in a more palatable form than the untreated oil, but even in the form of emulsions the unpleasant taste and odor of the cod liver oil persists to a considerable extent.

It has recently been discovered that the anti-rachitic and "vitamin" components of cod liver oil are non-saponifiable in nature, and these components have been separted from cod liver oil by the selective action of a solvent such as alcohol, which tends to more readily dissolve vitamin materials than the cod liver oil itself, followed by saponification of the resulting alcoholic solution, or by saponifying the oil in a solution of caustic alkali in alcohol, the solution of alkali hydroxide in alcohol being added to the oil to be treated and the mixture being kept either at room temperature or at a higher temperature until saponification occurs. The anti-rachitic growth-promoting and "vitamin" components are separated from the alcohol solution either by evaporating to dryness, and extracting the dry soap with ether, or by pouring the alcoholic product of saponification into a large volume of water and extracting with ether or equivalent solvent.

I have discovered that the procedure as used by previous investigators in this field can be materially improved and shortened and the use of alcohol can be avoided with corresponding cheapening of the process of treatment, by saponifying in an aqueous solution of alkali hydroxide under conditions that permit of the subsequent separation and isolation of the unsaponifiable components.

In the preferred form of my invention saponification of the oil is effected by an aqueous solution of alkali hydroxide in the presence of a non-saponifiable and water-insoluble agent which serves as a medium to take up and hold the non-saponifiable therapeutically active components as these are set free by the saponification of the glycerides forming the main constituent of the oil being treated. I may, for example, take 100 liters of cod liver oil to which I add 25 liters of a non-saponifiable and water-insoluble hydrocarbon, such as pentane for example. The pentane is thoroughly mixed with the cod liver oil by stirring, and the oil mixture is then thoroughly emulsified with an aqueous solution of sodium hydroxide or potassium hydroxide and saponified, saponification being preferably effected in a closed vessel under pressure sufficient to keep part of the pentane in liquid condition.

In the saponification step, I prefer to employ the methods ordinarily used in the saponification of oils in aqueous solutions of caustic alkalies. The saponification value of cod liver oil varies, in the case of different samples, from about 170 milligrams KOH per gram of the cod liver oil, to 190 milligrams KOH per gram of cod liver oil. In the commercial separation of vitamins from cod liver oil I prefer to use sodium hydroxide or caustic soda as my alkali, because of its relative cheapness as compared with potassium hydroxide or caustic potash, and I may use a chemically proportional amount of sodium hydroxide to the amount of potassium hydroxide called for by the saponification value of a sample of the oil, although in practice I prefer to employ twenty pounds of sodium hydroxide to each one hundred pounds of cod liver oil saponified, for the purpose of insuring a satisfactory excess of alkali. I find it convenient to saponify at atmospheric pressure, using a reflux condenser to return to the boiling mixture the volatilized portions of water and carrier body, but to avoid loss of vitamins it is somewhat preferable to saponify in a closed vessel with continuous agitation, employing a temperature somewhat below the boiling point of the aqueous lye solution.

Very intimate contact between the oil to be saponified and the aqueous solution of caustic alkali is desirable, and can be conveniently brought about by a preliminary emulsifying treatment and then passing the emulsified product through homogenizing apparatus for the purpose of modifying the size of the oil globules, and reducing them to very small size. When a non-saponifiable and water-insoluble carrier agent is used which is highly volatile at the temperature at which saponification is carried on, the use of a reflux condenser to secure the return of the carrier agent to the saponifying mixture may be employed to advantage, the condensed carrier agent from the reflux condenser being preferably delivered to the bottom of the saponification vessel by means of a tube, as in this way a desirable stirring of the saponifying mixture is brought about. Mechanical stirring during saponification may of course be employed.

The pentane is not acted upon by the alkali, and after the saponification of the oil exists in the mixture as a series of small drops or droplets throughout the saponifying mixture. The non-saponifiable anti-rachitic factor in the oil is taken up by the pentane during the progress of saponification as the cod liver oil is broken up into soap and glycerin and without the vitamin material existing at any time during the saponification treatment in free condition unassociated with a solvent, and upon the completion of saponification all of the therapeutically active non-saponifiable constituents originally present in the cod liver oil are found in the pentane. This pentane solution is much lighter than the lye solution containing the soaps formed by the saponification of the original cod liver oil, and may be separated from the aqueous lye solution by centrifugal action or other suitable demulsification treatment, preferably after the separation of all or part of the soap and the addition of a further quantity of water for the purpose of securing a desirable degree of dilution. The therapeutically active constituents of cod liver oil are substances of unknown composition, but have a very high boiling point, and can be readily separated from the pentane mixture by evaporation, preferably under reduced pressure.

My present invention rests upon my discovery that, contrary to the view previously held, it is unnecessary to employ alcoholic solutions of an alkali hydroxide in the saponification of cod liver oil and like saponifiable oils containing non-saponifiable anti-rachitic and vitamin components, and that vitamin materials can exist in contact with both dilute and concentrated solutions of aqueous alkali without decomposition.

Instead of using pentane as the "carrier" body for the non-saponifiable constituents of the cod liver oil, I may employ any other suitable non-saponifiable but water-insoluble substance either of higher or of lower boiling point than pentane, the essential requirements of a suitable carrier body being high solubility for vitamins, low solubility in water and in solutions of alkali hydroxides, and a high degree of resistance to the hydrolytic and saponifying action of caustic alkali solution and particularly of hot caustic alkali solutions.

As examples of suitable materials, combining in a satisfactory way high solubility for vitamins with low solubility in water and high resistance to saponification, among aliphatic bodies I may use liquid pentane and liquid hexane, as examples of straight chain aliphatic hydrocarbons, and dimethyl-bufane or di-isopropyl and dimethylhexane or di-isobutyl, as examples of branched chain aliphatic hydrocarbons. Instead of aliphatic hydrocarbons I may use carbocyclic hydrocarbons, examples of which are hexahydrobenzene and methylcyclohexane. Normal benzene may also be used, but is less satisfactory than the compounds already named because of the low solubility in it of some of the vitamins.

Although hydrocarbons represent the most satisfactory substances for use as carrier substances in the practice of my invention, I find that other difficultly saponifiable water-insoluble vitamin solvents may be used with substantially equal success. As an example of a chemical body which is not a hydrocarbon and which may be used in the practice of my present invention I will mention carbon tetrachloride, which combines high solubility for vitamins with low solubility in water and in caustic alkali. Long continued boiling with strong solutions of caustic tend to decompose carbon tetrachloride slightly, so that its use is not as satisfactory as the use of pentane for example, but the products of the hydrolysis of carbon tetrachloride by boiling solutions of caustic soda are water soluble and thus readily separable from the vitamin concentrates, and in the ordinary saponification of cod liver oil for example, I find that the amount of hydrolysis of the carbon tetrachloride used is relatively unimportant, although when using carbon tetrachloride or other slightly soluble or slightly hydrolyzable material in place of pentane in the practice of my invention, I find it advisable to use a slight excess over the amount of carrier normally used in the case of pentane, to allow for increased loss of the carrier body.

It will be noted that a wide variety of materials may be used as carrier bodies in the practice of my invention, without departing from the essential principle of having present, during saponification, a non-saponifiable or difficulty saponifiable water-insoluble solvent for vitamins, so that as the main quantity of saponifiable oil is broken up into water-soluble products in the course of saponification there will be present in the mass of material being treated a proper amount of a non-saponifiable solvent for the non-saponifiable vitamin materials to take up these vitamin materials as they are set free in the course of saponification, and to hold them in condition suitable for separation in a subsequent step in which the soap, glycerin and other water-soluble bodies formed from the saponification of the oil are separated from the water-insoluble carrier body containing the vitamin materials which it has dissolved. Instead of directly saponifying cod liver oil or equivalent oil with an aqueous solution of alkali hydroxide, I may first treat the oil by the well known catalytic process of saponification by the use of Twitchel's reagent or an equivalent catalytic saponifying agent.

The catalytic saponification should preferably be carried out in a closed vessel to exclude air, and the use of nitrogen or other neutral gas in the portion of the treating vessel not filled with the saponification mixture is desirable. I find it advantageous to run my mixture of oil, water and catalytic reagent through emulsifying or homogenizing apparatus as a means of obtaining the desired intimacy of contact. A relatively short period of catalytic saponification is desirable. The fatty acids rise to the top of the aqueous glycerin solution, and after washing with water may be saponified in substantially the same manner that is employed in the direct treatment of cod liver oil, the catalytic process of treatment having the advantage of enabling the glycerin originally present in the cod liver oil to be obtained in more concentrated condition than by direct saponification, although a disadvantage of the process is that part of the therapeutically active bodies in the cod liver oil are destroyed so that the yield of therapeutically active agent is lower than when the saponification of the oil is brought about directly by the use of aqueous solutions of alkali hydroxide.

With the active non-saponifiable bodies which I obtain by the processes already described there is present a small amount of the non-saponifiable cholesterol originally present in the oil. Where the presence of cholesterol is undesirable (as for example where a product of the highest possible therapeutic activity is desired) the cholesterol may be separated by a suitable reagent such as digitonin, according to known methods. In general I do not find it of advantage to separate the cholesterol, as its presence in the finished product as a diluent does no harm.

I find it of advantage after separating the carrier and its contained vitamins from the aqueous saponifiable soap mixture to add cocoa butter or other oil or fat to my pentane or other absorbent for the unsaponifiable constituents in my oil, as there is a tendency for the therapeutically active constituents to lose activity in time through oxidation, and the present of butter fat, cocoa butter or other solid or liquid oil or fat when present in equal or greater volume than the unsaponifiable material tends to a marked extent to protect the therapeutically active bodies of unknown composition from oxidation and loss of activity.

In one form of my invention I employ a large excess of butter fat as a protecting agent for my unsaponifiable products, thus obtaining as a final product the therapeutically active agents from cod liver oil disseminated in butter, this representing a very palatable and efficacious means of administering these bodies.

In all the steps of treating cod liver oil and other similar oils in accordance with my present invention, I find the exclusion of air to be advantageous, and I prefer to saponify the oil, and to treat the unsaponifiable materials remaining, in vessels in which the air originally present has been displaced by nitrogen or other neutral gas. The final product particularly when containing an admixed fat or oil is relatively resistant to the action of air however, and may be kept for a long period without loss of activity.

Instead of employing cod liver oil as my raw product I may treat directly the fish livers, combining in a single heating operation the steaming of the livers to separate the contained oil and the saponifying operation by which the oil is transformed into glycerin and soap. The treating of the fresh livers gives a higher yield of therapeutically active non-saponifiable products due to decomposition and loss of the active bodies being prevented by the reduced total time of treatment. By extracting the livers, particularly after separation of the portion of the oil that is readily removed by steaming, with a non-saponifiable water-insoluble solvent such as pentane for example, the solvent with its dissolved materials being added to the main quantity of extracted oil, which is then saponified with aqueous alkali as already described, a materially increased yield of therapeutically active material is obtained, as compared with the yield obtained by known methods.

Although it was known, prior to my present invention, that vitamin materials could be dissolved from cod liver and other like oils by the action of relatively large amounts of a solvent such as alcohol, and that the vitamin material could be separated from such alcoholic solution containing both the dissolved vitamin bodies and small amounts of dissolved cod liver oil by saponification with alkali, for which purpose both alcoholic alkali and aqueous alkali solutions have been used, and although it was known prior to my present invention that vitamin materials could be set free from cod liver and other like oils by the action of alcoholic potash and alcoholic solutions of other alkalies, it was not known prior to my present invention that the use of alcohol was unnecessary and that aqueous alkali could be used for the saponification of vitamin-containing oils without destruction of the vitamin material.

I do not claim as any part of my invention the saponification of the concentrated extract of cod liver or other like oils obtained by treating such oils with a selective solvent such as alcohol to obtain the vitamin material in dissolved condition in such solvent, and the subsequent treatment of such solution (containing a very small portion of dissolved cod liver oil) by an aqueous alkaline solution, but I broadly claim as a step in the separation of vitamins from cod liver oil and other like vitamin-containing oils, the direct saponification of such vitamin-containing oils by an aqueous alkaline solution, either in the presence or in the absence of a non-saponifiable, water-insoluble liquid carrier agent.

By aqueous alkaline reagent as used in this specification and in the claims is meant a solution of an alkali in which the predominating solvent medium is an aqueous fluid, as distinguished from alcoholic solutions of alkaline reagents, the use of which in the separation of vitamin materials from saponifiable oils was considered essential up to the time of the present invention.

It will be evident that many modifications may be made without departing from the essential features of my invention as herein described, and accordingly no limitations should be imposed upon my invention except such as are indicated in the appended claims.

Inasmuch as the lowering of cost and the avoidance of the fire hazard are important features of this invention, it is preferred that no alcohol be used but the term non-alcoholic, as used in the claims, is to be understood as meaning that any alcohol present is less than that amount which could be recovered economically or would substantially alter the process claimed.

I claim:

1. As a step in the separation of vitamins from saponifiable oils the process which comprises heating a mixture of a saponifiable oil and pentane with an aqueous nonalcoholic solution of a caustic alkali.

2. In the process of obtaining the vitamin content of saponifiable animal oils, such as fish liver oils; that step which consists in saponifying the oil with an aqueous, non-alcoholic solution of caustic alkali, whereby subsequent recovery of the vitamin material is facilitated because of the separation of the vitamin material from the saponifiable portion of the oil by such step.

3. The step of claim 2 when carried out in substantial absence of free oxygen, whereby the oxidizing of the vitamin content is minimized.

4. The step of claim 2 when carried out in an atmosphere of an inert gas such as nitrogen.

5. In obtaining a vitamin concentrate from saponifiable animal oils, the step of saponifying the oil with an aqueous, non-alcoholic alkali metal hydroxide.

6. In obtaining a vitamin concentrate from saponfiable oils, the step of saponifying the oil with an aqueous, non-alcoholic, caustic alkali.

7. The step of claim 6 plus the step of removing unsaponifiable oily materials present in the resulting non-alcoholic soap solution.

8. In obtaining a vitamin concentrate from saponifiable oils, the step of saponifying the oil with an aqueous, non-alcoholic sodium hydroxide.

9. In the process of concentrating the vitamin content of saponifiable animal oils, such as fish liver oils; the steps of saponifying the oil with an aqueous solution of an akali metal hydroxide in substantial absence of alcohol and free oxygen, and extracting the vitamin content by an agent having high solubility for vitamins, low solubility in water and in solutions of alkali hydroxide, and having high resistance to the hydrolytic and saponifying action of caustic alkali solution.

10. In the process of obtaining the vitamin content of saponifiable animal oils, such as fish liver oils; the step of saponifying the oil with an aqueous solution of sodium hydroxide, in substantial absence of alcohol and free oxygen, and in presence of a non-saponifiable and water insoluble agent, which agent serves as a medium to take up and hold the non-saponifiable vitamin content as this vitamin content is set free from the saponifiable glycerides forming the main constituent of the oil being treated; said agent having a high solubility for vitamins, low solubility in water and in solutions of alkali hydroxides, and having high resistance to the hydrolytic and saponifying action of caustic alkali solution.

11. As a step in the separation of the vitamin content of saponifiable oils, treating a mixture of such oil in presence of pentane and an aqueous nonalcoholic solution of sodium hydroxide.

WALTER O. SNELLING.